United States Patent
Steinert et al.

(10) Patent No.: US 9,546,001 B2
(45) Date of Patent: Jan. 17, 2017

(54) OUTFLOW VALVE FOR AN AIRCRAFT

(75) Inventors: Martin Steinert, Seligenstadt (DE); Frank Kameier, Dusseldorf (DE); Dusan Vranjes, Frankfurt (DE)

(73) Assignee: Nord-Micro GmbH & Co. OHG, Frankfurt (DE)

( * ) Notice: Subject to any disclaimer, the term of this patent is extended or adjusted under 35 U.S.C. 154(b) by 1030 days.

(21) Appl. No.: 12/671,713

(22) PCT Filed: Aug. 5, 2008

(86) PCT No.: PCT/EP2008/060260
§ 371 (c)(1),
(2), (4) Date: Feb. 2, 2010

(87) PCT Pub. No.: WO2009/019264
PCT Pub. Date: Feb. 12, 2009

(65) Prior Publication Data
US 2010/0291852 A1 Nov. 18, 2010

(30) Foreign Application Priority Data

Aug. 6, 2007 (DE) .................. 10 2007 036 999

(51) Int. Cl.
B64D 13/02 (2006.01)
F16K 1/22 (2006.01)
(Continued)

(52) U.S. Cl.
CPC .............. B64D 13/02 (2013.01); F16K 1/222 (2013.01); F16K 1/223 (2013.01); F16K 47/045 (2013.01); F24F 13/06 (2013.01); F24F 13/24 (2013.01)

(58) Field of Classification Search
CPC ...................................... B64D 13/02
(Continued)

(56) References Cited

U.S. PATENT DOCUMENTS 2,800,291 A * 7/1957 Stephens ............. B62D 35/00
114/67 R
3,426,984 A * 2/1969 Emmons ............. B64D 13/02
244/117 R
(Continued)

FOREIGN PATENT DOCUMENTS

DE 10240762 A1 4/2003
DE 10313729 A1 10/2004
(Continued)

OTHER PUBLICATIONS

PCT International Preliminary Report on Patentability for PCT/EP2008/060260, issued Mar. 2, 2010, 6 pages.
International Search Report for PCT/EP2008/060260.

*Primary Examiner* — Steven B McAllister
*Assistant Examiner* — Jonathan Cotov
(74) *Attorney, Agent, or Firm* — Thomas B. Ryan; Harter Secrest & Emery LLC

(57) ABSTRACT

The invention relates to a valve for controlling a fluid flow from a first environment to a second environment, having a frame for disposing a separating element in the region of an opening, said element separating the first environment from the second environment, and a first flap and a second flap for controlling the fluid flow through the opening between the first environment and the second environment, the flaps being movable in the frame. The flaps have protrusions designed to reduce noise generation in the fluid flow.

33 Claims, 4 Drawing Sheets

(51) Int. Cl.
    *F16K 47/04*    (2006.01)
    *F24F 13/06*    (2006.01)
    *F24F 13/24*    (2006.01)

(58) Field of Classification Search
    USPC ....... 454/71, 72, 73, 74, 76, 906; 244/129.1,
                                    244/129.4, 117 R; 251/212
    See application file for complete search history.

(56) References Cited

U.S. PATENT DOCUMENTS

| | | | | |
|---|---|---|---|---|
| 3,544,045 | A * | 12/1970 | Butscher | 244/129.1 |
| 3,740,006 | A * | 6/1973 | Maher | 244/129.5 |
| 4,354,648 | A * | 10/1982 | Schenk et al. | 244/200.1 |
| 4,960,249 | A * | 10/1990 | Signoret et al. | 244/118.5 |
| 5,058,837 | A * | 10/1991 | Wheeler | 244/200.1 |
| 5,598,990 | A * | 2/1997 | Farokhi et al. | 244/200.1 |
| 5,833,389 | A * | 11/1998 | Sirovich et al. | 405/52 |
| 5,881,995 | A | 3/1999 | Tse et al. | |
| 6,116,541 | A * | 9/2000 | Chuang | B64D 13/02 244/1 N |
| 6,273,136 | B1 * | 8/2001 | Steinert | B64D 13/02 137/601.08 |
| 6,485,093 | B2 * | 11/2002 | Reivers | B60J 7/22 296/180.1 |
| 6,682,413 | B1 * | 1/2004 | Hoffman | B60H 1/248 454/156 |
| 7,185,853 | B2 * | 3/2007 | Kelnhofer | B64D 13/02 244/129.5 |
| 7,198,062 | B2 * | 4/2007 | Hoffman | B60H 1/248 137/601.09 |
| 8,342,920 | B2 * | 1/2013 | Tanner | B64D 13/02 244/1 N |
| 8,840,451 | B2 * | 9/2014 | Royalty | B64D 13/02 137/809 |
| 2010/0096503 | A1 * | 4/2010 | Tanner | B64D 13/02 244/129.4 |

FOREIGN PATENT DOCUMENTS

| | | |
|---|---|---|
| EP | 1783409 A1 | 5/2007 |
| JP | 2001050215 A * | 2/2001 |
| WO | 2005023649 A1 | 3/2005 |

* cited by examiner

OUTFLOW VALVE FOR AN AIRCRAFT

The present invention relates to a valve for controlling a fluid flow from a first environment to a second environment, having a frame for disposing a separating element in the region of an opening, said element separating the first environment from the second environment, and a first flap and a second flap for controlling the fluid flow through the opening between the first environment and the second environment, the flaps being moveable in the frame.

Such valves are often used to control the pressure in separated environments. Such a separated environment has an inlet valve through which fluid can flow into the environment. The flow of fluid into the separated environment, causes a pressure build-up in the environment. The valve of the initially mentioned type allows a flow cross-section to be controlled as an outlet, by means of which the pressure can be reduced by letting the fluid flow out. The smaller the flow cross-section the higher the pressure remaining in the separated environment.

This principle of pressure control is used, for example, in pressure chambers or in aircraft. Such valves are variously known from the state of the art.

Thus, U.S. Pat. No. 3,426,984 shows an outflow valve for an aircraft. The outflow valve is arranged in an opening in the outer shell of an aircraft. Two valve flaps are pivotably mounted on the edges of the opening and coupled via a mechanism in such a way that they are commonly pivotable. The flaps are arranged so that they extend toward each other and overlap in a central region when the valve is closed. In this case, the flaps essentially extend flush with the outer shell of the aircraft so that aerodynamically they present few points of attack. In the opened state of the valve, one flap shields the opening against any airflow flowing along the outside of the aircraft.

Generally, when valves of the initially mentioned type are opened a clearly discernible noise results due to the escaping air. This is why in the state of the art, various approaches can be found which attempt to reduce the noise.

For example, DE 103 13729 A1 suggests that a Laval nozzle is imitated by the shape of the flaps as the valve is opened. By these means the air exits from the valve at supersonic speed, and the sound is deflected away from the valve.

U.S. Pat. No. 6,116,541 discloses that the leading edge of a second flap is configured with notches. Furthermore, a web extending in a direction which is transverse to the flow direction of the escaping air is provided on the first flap, and has the purpose of slowing down the escaping air. In addition, on the fluidflow facing side of the edge, notches are provided to reduce noise.

Furthermore, WO 2005/023649 A1 discloses a valve of the initially mentioned type wherein notches that create eddies are formed in the edges of the valve flaps. It is also disclosed that regions of the flaps are roughened to reduce the noise of the escaping air.

It is therefore the object of the present invention to reduce the noise of a valve of the initially mentioned type.

According to claim 1, this object is achieved by the flaps having protrusions formed in such a way that they reduce the noise in the fluid flow.

Advantageous embodiments are the subject matter of the dependent claims.

The approach according to the present invention ensures that the formation of disruptive noise is prevented by the irregular fluid flow caused by the protrusions. This is achieved by causing eddies to be created at the protrusions due to their shape, which propagate in an expansive manner in the flow direction in the form of eddy plaits. Due to the expanding flow, the eddies overlap downstream and are thus mutually disruptive. This prevents the formation of regular or stationary eddies which would lead to increased noise.

Furthermore, it is advantageous that by changing the shape and configuration, the valve can be adapted to various applications, such as different flow velocities or fluids having various properties, without having to change the basic structure of the valve.

The first flap can advantageously have first protrusions having an outline, side surfaces and a top surface, preferably on an inner surface near an edge adjacent to a flow cross-section through which fluid flows out. Exiting fluid first flows along the inner surface of the first flap before it exits through the flow cross-section.

The arrangement of the protrusions in the flow path of the fluid ensures that the protrusions can have their maximum effect.

In an advantageous embodiment, the first protrusions have an essentially triangular outline, wherein a corner point of the outline defines a tip and the two other corner points define a base of the outline. Such a triangular outline allows the pressure distribution of a fluid flow to be advantageously influenced and eddy plaits with an advantageous diameter to be created.

The top surface of the first protrusions can advantageously have a concave configuration. This allows the flow to be advantageously influenced.

The top surface of the first protrusions is advantageously formed as an upward ramp in the flow direction. By their rise in the flow direction it is ensured that the first protrusions gradually influence the fluid flow and no undesirable singularities are formed.

In a particularly advantageous embodiment, the surface of the first protrusions is formed as a section of a cylindrical surface, wherein the axis of the cylinder is essentially parallel to the bottom and normal to the flow direction.

An edge of the first protrusions can be formed as a flow break-away edge to specifically induce eddies.

Furthermore, the tip of the triangle forming the outline of the first protrusion advantageously faces the flow direction.

The length of the base of the first protrusion can have a ratio to a length of an edge extending from the tip to the base of the outline of the first protrusions of at least 0.5 and no more than 0.9, advantageously between 0.69 and 0.71.

The height of the first protrusions can have a ratio to a length of the edges extending from the tip to the base of the outline of the first protrusions of at least 0 and no more than 0.4, advantageously between 0.19 and 0.21.

The diameter of the cylinder defining the top surface of the first protrusions can have a ratio to a length of the edges extending from the tip to the base of the outline of the first protrusions of at least 2 and no more than 6, advantageously between 3.9 and 4.1.

The first protrusions can be arranged in rows extending transverse to the flow direction. By this configuration it is possible to influence the fluid flow across its entire width.

Furthermore, the first protrusions are advantageously arranged in staggered rows transverse to the flow direction. By these means, an interaction of the eddy plaits between the rows is encouraged.

Advantageously, the second flap has first protrusions on an outer surface in the vicinity of an edge adjacent to the flow cross-section. This ensures that the already flown out fluid, which flows along the separating element on the outer surface of the second flap, is influenced in a noise-reducing manner.

Furthermore, the second flap can have two protrusions, with an outline, side surfaces and a top surface, in the vicinity of an edge adjacent to the flow cross-section.

By these means it is ensured that fluid flowing along the inner surface of the second flap is conditioned prior to flowing out.

The second protrusions advantageously have an essentially trapezoidal outline, wherein a shorter side of the parallel sides of the outline defines a tip and a longer one of the parallel sides of the outline forms a base. This outline takes the flow conditions into account which are present in the places in which the second protrusions are arranged.

The top surface of the second protrusions is advantageously formed as an upward ramp in the flow direction. By these means, a discontinuity is avoided as the fluid flow impinges on the protrusions.

The top surface of the second protrusion is advantageously planar.

Furthermore, the tip of the second protrusions is preferably upstream of the base.

The edges forming the tip and the base of the second protrusions are advantageously arranged transverse to the flow direction. By these means, the influence of the second protrusions on the fluid flow can easily be determined.

The base of the second protrusions advantageously forms a flow break-away edge.

The length of the flow separation edge of the second protrusions can have a ratio to a length of the edges of the outline extending from the tip to the base of the second protrusions of at least 0.5 and no more than 0.9, preferably between 0.69 and 0.71.

The length of the base of the second protrusions can have a ratio to a length of the edges extending from the tip to the base of the outline of the second protrusions of at least 0.7 and no more than 1.1, advantageously between 0.89 and 0.91.

The length of the tip of the second protrusions can have a ratio to a length of the edges extending from the tip to the base of the outline of the second protrusions of at least 0 and no more than 0.4, advantageously between 0.09 and 0.11.

The height of the second protrusions can have a ratio to a length of the edges extending from the tip to the base of the outline of the second protrusions of at least 0.1 and no more than 0.5, advantageously between 0.29 and 0.31.

In an advantageous embodiment, the second protrusions are arranged in a row essentially transverse to the flow direction, which ensures that the fluid flow is influenced by the effect of the second protrusions across its entire width.

Advantageously, the number of the first protrusions exceeds the number of the second protrusions.

Furthermore, the second protrusions advantageously have a greater volume than the first protrusions, which ensures that the different flow conditions in the area of the first protrusions and the second protrusions is taken into consideration.

The bottom portion of the protrusions can be configured to have rounded corners. By these means, an eddy formation specifically in the center with respect to the height of the flow-through opening is achieved.

The edge adjacent to the flow cross-section of the second flap advantageously has a rounded configuration to obstruct the fluid flow as little as possible.

In a further preferred embodiment, two rows of first protrusions are arranged on each flap.

The invention will be explained in the following with reference to an exemplary embodiment illustrated in the accompanying drawings, in which.

Figure 1:
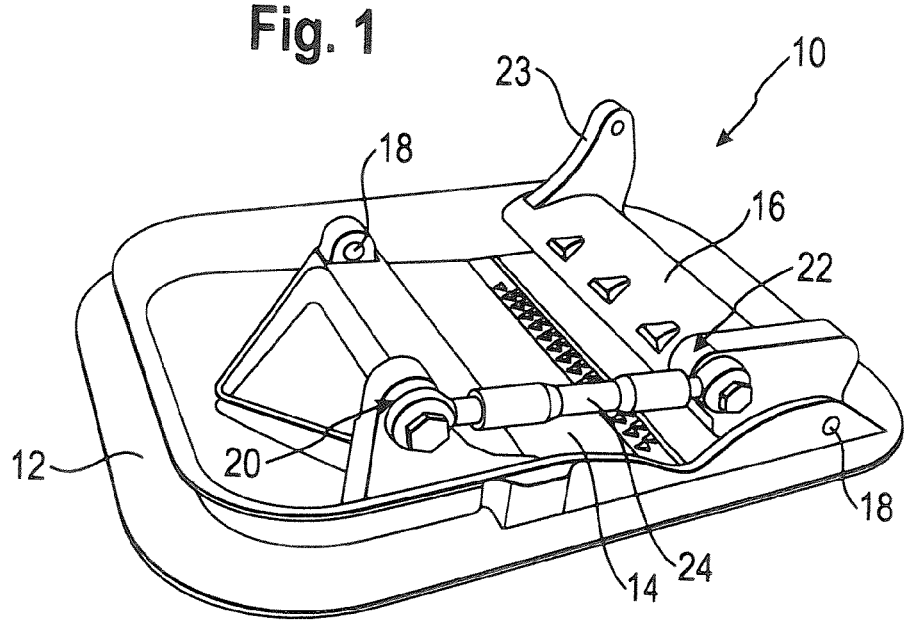
FIG. 1 is a perspective view of an embodiment of the valve according to the present invention.

Valve 10 shown in FIG. 1 is used as an outflow valve in an aircraft. Valve 10 has a frame 12, in which a first flap 14 and a second flap 16 are arranged. First flap 14 is larger than second flap 16. Furthermore, flaps 14, 16 are pivotably joined to frame 12 by means of bearings 18. Frame 12 of valve 10 is inserted in an opening in the hull of an aircraft.

First flap 14 has a connecting portion 20, and second flap 16 has a connecting portion 22. The connecting portions 20, 22 are coupled by means of a linkage mechanism 24, which defines the position of first flap 14 relative to second flap 16.

Furthermore, second flap 16 has a control portion 23 which is connected to a drive (not shown) via a linkage mechanism to control the pivoting position of second flap 16. Since flaps 14, 16 are linked by means of linkage mechanism 24, the position of the two flaps and thus the opening cross section can be controlled by means of a single drive.

Figure 2:
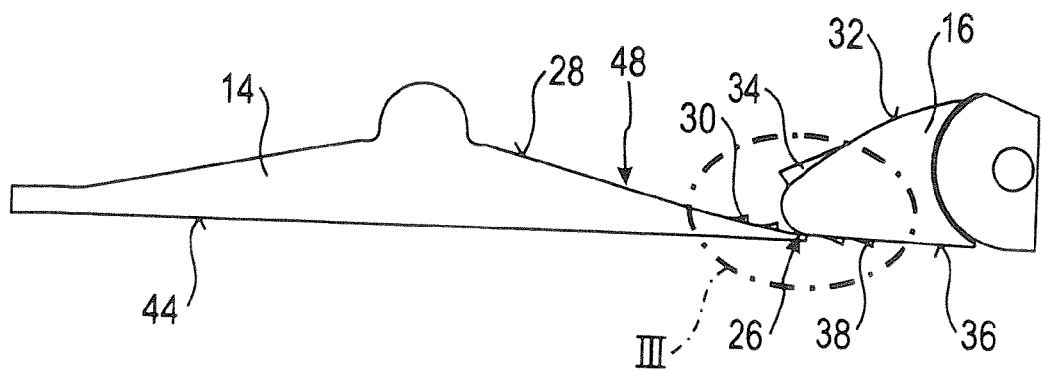
FIG. 2 is a sectional view along a flow direction of the first flap and the second flap.

In the closed position, as shown in FIG. 2, flaps 14, 16 are in contact in a contacting area 26. By these means secure closing of valve 10 is ensured. First flap 14 has first protrusions 30 on its inner surface 28. Second flap 16 has second protrusions 34 on its inner surface 32 and first protrusions 38 on its outer surface 36. This arrangement is shown in detail in FIG. 3.

The edge area 40 of second flap 16 has a rounded configuration. Towards inner surface 32, second protrusions 34 are arranged immediately adjacent to edge area 40 and protrude from the planar surface of inner surface 32 so that they are immersed in airflow 42. First protrusions 38 are arranged at a distance to rounded edge area 40 towards outer surface 36.

Inner surface 28 of first flap 14 has a contacting area 46 adjacent to contacting area 26. In the area of contacting area 46, inner surface 28 extends parallel to outer surface 44 of first flap 14. A ramp area 48 is adjacent to contacting area 46 in which, at a distance to contacting area 46, first protrusions 30 are arranged in such a manner that they protrude into airflow 42.

Figure 4:
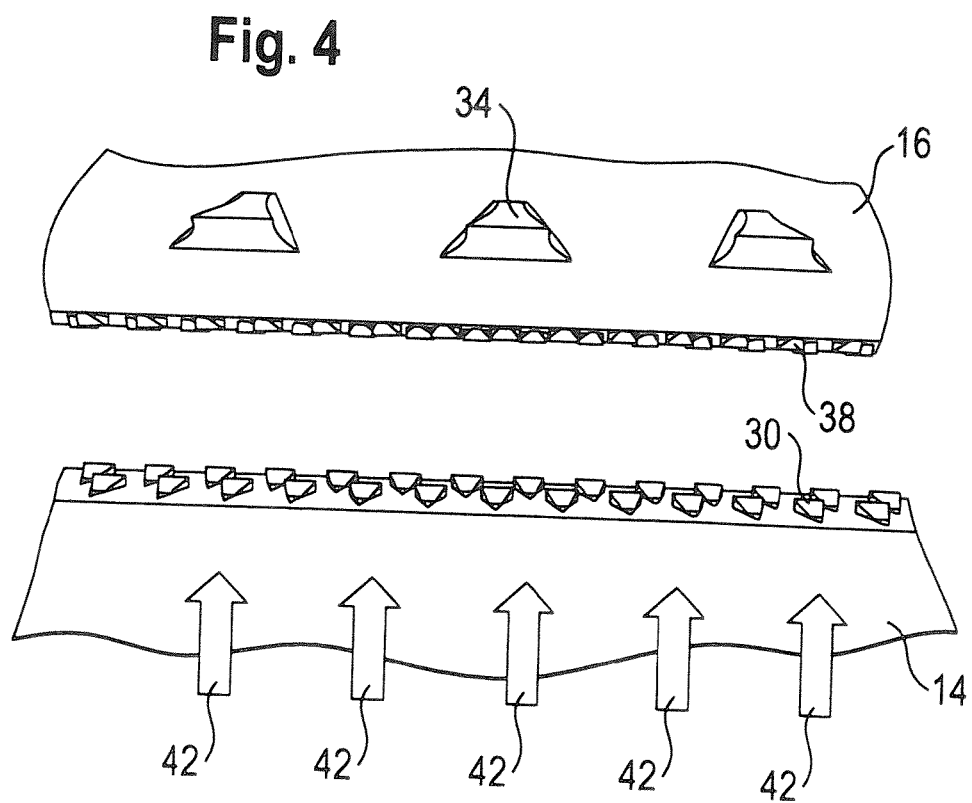
FIG. 4 is a perspective view along the fluid flow against the flaps in the open state.
Figure 5:
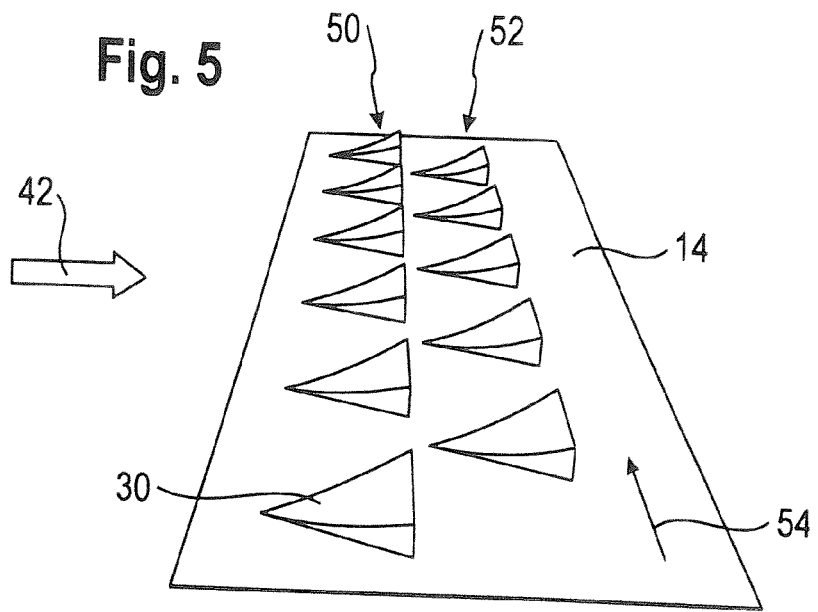
FIG. 5 is an exemplary arrangement of protrusions on a flap.

Protrusions 30, 34, 38 are, as can be seen in FIGS. 4 and 5, in rows 50, 52 transverse to the flow direction of airflow 42. Protrusions 30, 34, 38 are formed separate and spaced with respect to each other. Two rows 50, 52 each of first protrusions 30, 38 and a row of second protrusions 34 are provided. Protrusions 30 of a first row 50 are in a staggered configuration with respect to the protrusions of a second row 52 in the transverse direction 54.

Second protrusions 34 are formed in a row of three protrusions 34.

First protrusions 38 are arranged according to the same principle as first protrusions 30.

Figure 6:
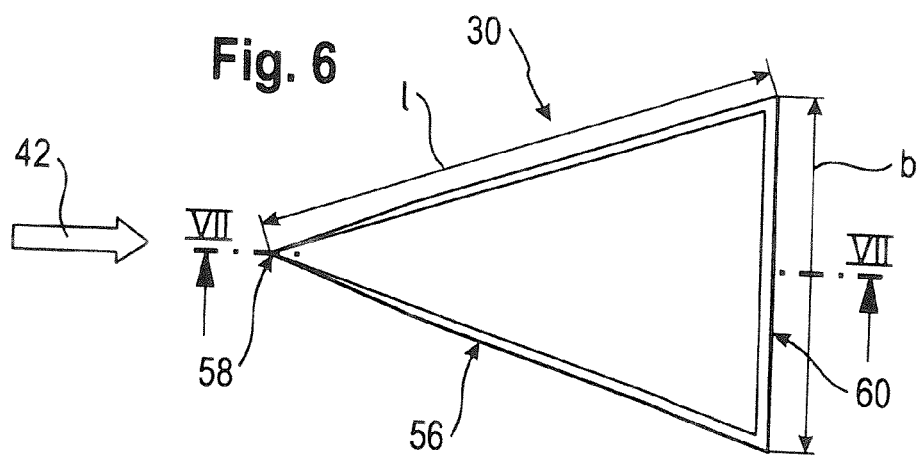
FIG. 6 is a plan view of an embodiment of the first protrusions.
Figure 7:
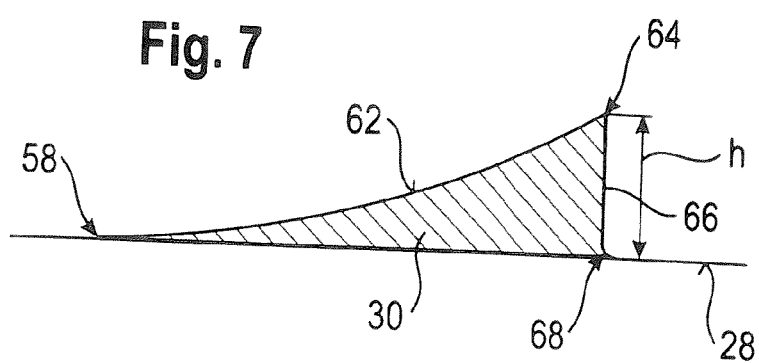
FIG. 7 is a cross section along line VII-VII of FIG. 6.

First protrusions 30 shown in FIGS. 6 and 7 have a triangular outline 56. Airflow 52 flows over tip 58 to base 60. Top surface 62 of first protrusions 30 is configured concavely as a section from a cylindrical surface. Top surface 62 forms an upward ramp in the direction of airflow 42 and ends in a flow break-away edge 64 on the back surface 66 extending essentially vertically to the inner surface 28. At the foot of back surface 66, a rounded bottom portion 68 is formed.

The ratio of width b of base 60 to length l of the legs of outline 56 is 0.7. Furthermore, height h of flow break-away edge 64 is 0.2 times length l. The ratio of the diameter of the cylinder used for forming surface 62 to length l is 4.

First protrusions 38 are essentially formed like first protrusions 30. However, their forms are adapted to the flow environment of their arrangement. First protrusions 38 have no bottom portion 68, for example.

Figure 8:
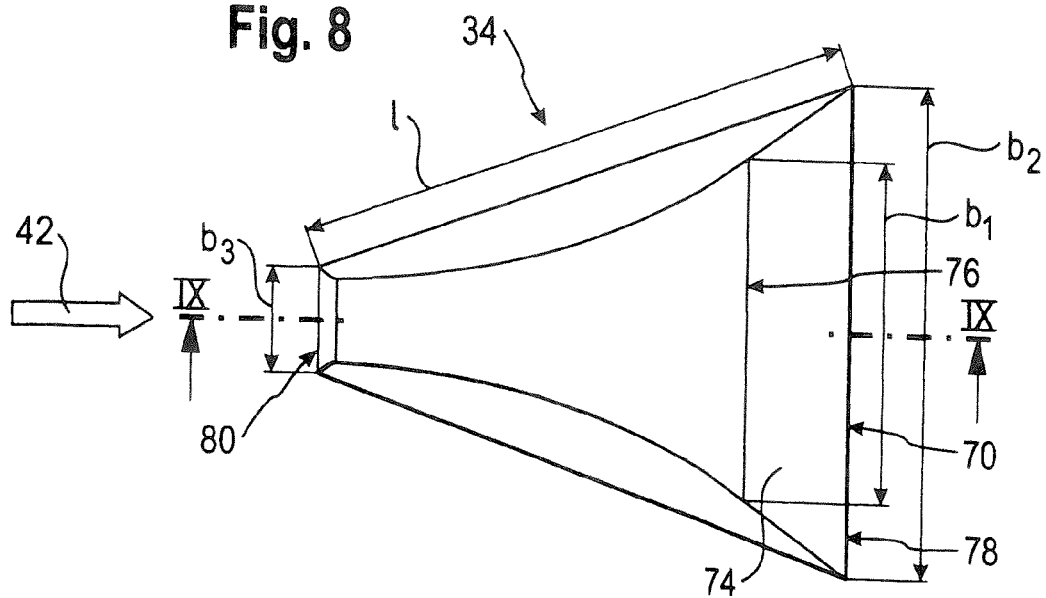
FIG. 8 is a plan view of an embodiment of the second protrusions.
Figure 9:
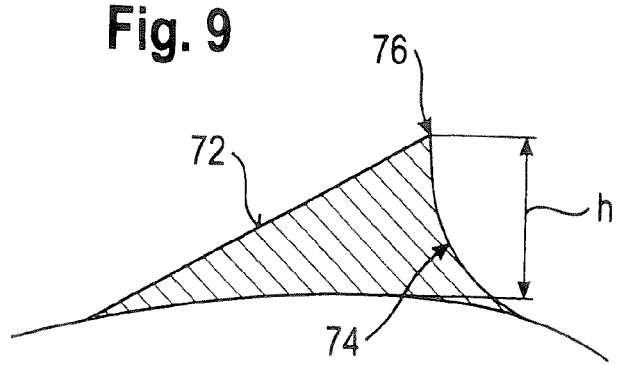
FIG. 9 is a cross sectional view along line IX-IX in FIG. 8.

Second protrusions 34 have a pronounced bottom portion 74, as can be seen from FIGS. 8 and 9. This is why width $b_1$ of flow break-away edge 76 and width $b_2$ of bases 78 of trapezoidal outline 70 of second protrusions 34 differ greatly. Top surface 72 has a planar configuration, in contrast to first protrusions 30, 38. Width $b_1$ of flow break-away edge 76 of second protrusions 34 is 0.7 times length l of outline 70. Width $b_2$ is 1.1 times length l and width $b_3$ of tip 80 is 0.1 times length l. Height h of flow break-away edge 76 is 0.3 times length l.

The shape of protrusions 30, 34, 38 with their high aspect ratio produces eddies. The interaction of eddy plaits created by protrusions 30, 34, 38 prevents the formation of uniform or stationary eddies which could lead to high noises.

Figure 3:
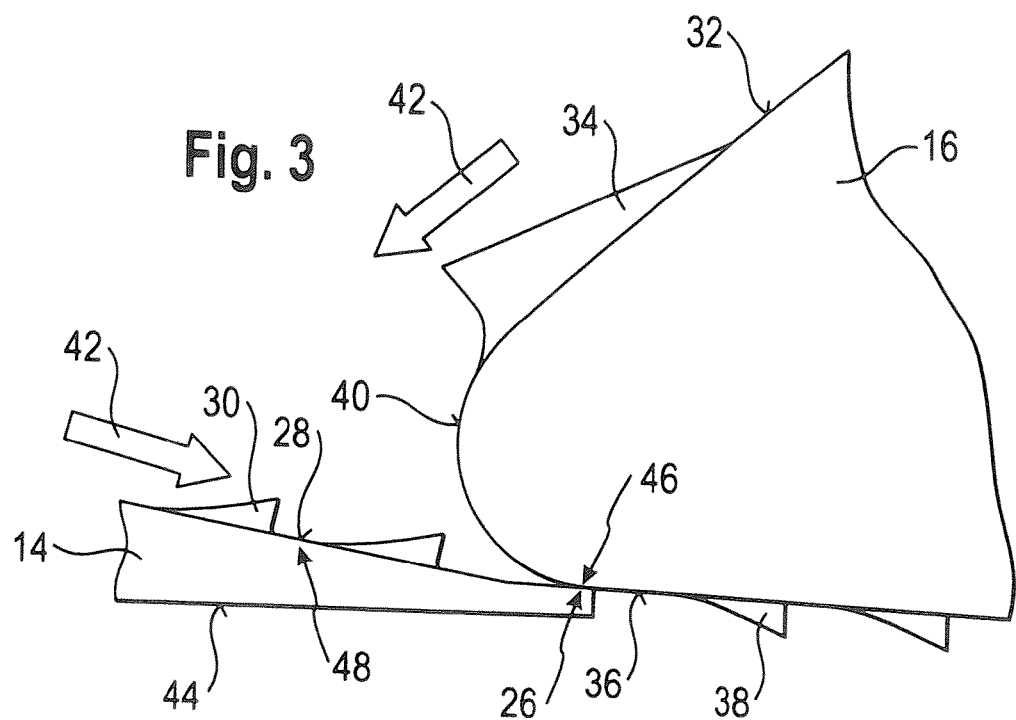
FIG. 3 shows the detail indicated as III in FIG. 2.

If valve 10 is thus opened by first flap 14 and second flap 16 being opened, airflow 42 begins to flow as shown in FIGS. 3 and 4. First protrusions 30, 38 and second protrusions 34 project into airflow 42 and cause the above-described effect.

It must be noted that the arrangement and form of the protrusions must be adapted to the respective framework conditions. The form and the arrangement of protrusions 30, 34, 38, in particular the form of the flaps, the pressure differential between inner surface 28, 32 and outer surface 36, 44 and the velocity of airflow 42 are critical for the construction of valve 10.

Flaps 14, 16 with protrusions 30, 34, 38 are thus made, for example, by milling from a solid aluminum block. This offers the possibility of fully automatic manufacture, such as on CNC milling machines. The person skilled in the art will know further methods, both manual and automatic, useful for their manufacture. The person skilled in the art will also know further suitable materials for use in valve 10.

Valve 10 together with frame 12 is inserted in an opening (not shown) of an aircraft shell. The position of flaps 14, 16 is used to control the amount of air that can escape from the cabin. In this way, the cabin interior pressure is controllable by means of varying the position of flaps 14. Protrusions 30, 34, 38 protruding into airflow 42 effect an intended influence on airflow 42 which leads to disruptive noise being minimized for the passengers of the aircraft.

LIST OF REFERENCE NUMERALS 10 valve
12 frame
14 first flap
16 second flap
18 bearing
20 connecting portion
22 connecting portion
24 hydraulic element
26 contacting area
28 inner surface
30 first protrusions
32 inner surface
34 second protrusions
36 outer surface
38 first protrusions
40 edge area
42 airflow
44 outer surface
46 contacting area
48 ramp area
50 first row
52 second row
54 transverse direction
56 outline
58 tip
60 base
62 top surface
64 flow break-away edge
66 back surface
68 bottom portion
70 outline
72 top surface
74 bottom portion
76 flow break-away edge
78 base
80 tip
b width
$b_1$ width
$b_2$ width
$b_3$ width
h height
l length

The invention claimed is:

1. An outflow valve for an aircraft to control a fluid flow between an inner environment and an outer environment of the aircraft, comprising:

a frame arranged to be disposed in an opening between the inner environment and the outer environment of the aircraft;

a first flap and a second flap contacting the first flap, the flaps being moveable within the frame for controlling the fluid flow through the opening between the inner environment and the other environment, each of the first and second flaps including an inner surface oriented within the frame for facing the inner environment and an outer surface oriented within the frame for facing the inner environment and an outer surface oriented within the frame for facing the outer environment in a close position of the outflow valve, the first and second flaps having a mutually contacting area between the inner surface of the first flap and the outer surface of the second flap for closing the outflow valve, the first flap including a plurality of first protrusions spaced-apart on the inner surface of the first flap, the second flap including a plurality of second protrusions spaced-apart on the inner surface of the second flap, the pluralities of first and second protrusions being spaced from the mutual contacting area of the flaps, each of the first protrusions of the first flap having a bottom portion on the inner surface of the first flap, each of the second protrusions of the second flap having a bottom portion on the inner surface of the second flap, each of the first and second protrusions having side surfaces arranged in a closed outline projecting from the bottom portion of each of the first and second protrusions and an exposed top surface projecting into the fluid flow through the opening between the inner environment and the outer environment, the closed outlines of the side surfaces and the exposed top surfaces of the spaced-apart protrusions on the inner surfaces of the first and second flaps providing for creating overlapping, mutually disruptive vortices in the fluid flow to reduce noise, and the first and second protrusions being shaped differently.

2. The valve according to claim 1, in which the closed outline of each of the first and second protrusions tapers from narrow to wide in the flow direction.

3. The valve according to claim 2, in which the side surfaces of the first protrusions are arranged in a triangular outline, wherein a corner point of the outline defines a tip and the two other corner points define a base of the outline.

4. The valve according to claim 3, in which the top surface of each of the first protrusions is formed as a section of a cylindrical surface, wherein the axis of the cylinder is essentially parallel to the outline and normal to the flow direction.

5. The valve according to claim 4, in which the diameter of the cylinder that defines the top surface of the first protrusions and the length (l) of the edges extending from the tip to the base of the outline of the first protrusions have a ratio of at least 2 and no more than 6, preferably between 3.9 and 4.1.

6. The valve according to claim 3, in which an edge between the top surface and one of the side surfaces at the base of the triangular outline of the first protrusions is formed as a flow break-away edge.

7. The valve according to claim 3, in which the tip of the triangular outline of the first protrusions faces the flow direction.

8. The valve according to claim 3, in which a length (b) of the base and a length (l) of the edges extending from the tip to the base of the outline of the first protrusions have a ratio b/l of at least 0.5 and no more than 0.9, preferably between 0.69 and 0.71.

9. The valve according to claim 3, in which the height (h) of the first protrusions and the length (l) of the edges extending from the tip to the base of the outline of the first protrusions have a ratio h/l of at least 0 and no more than 0.5, preferably between 0.19 and 0.21.

10. The valve according to claim 2, in which the top surface of each of the first protrusions has a concave configuration.

11. The valve according to claim 2, in which the top surface of each of the first protrusions is in the form of an upward ramp in the flow direction.

12. The valve according to claim 2, in which the side surfaces of the second protrusions on the inner surface of the second flap are arranged in trapezoidal outline, wherein a shorter side of the parallel sides of the outline define a tip and a longer one of the parallel sides of the outline define a base.

13. The valve according to claim 12, in which the tip of the second protrusions is arranged upstream of the base.

14. The valve according to claim 12, in which the edges forming the tip and the base of the second protrusions are arranged essentially transverse to the flow direction.

15. The valve according to claim 12, in which an edge between the top surface and one of the side surfaces at the base of the trapezoidal outline of the second protrusions is formed as a flow break-away edge.

16. The valve according to claim 15, in which the length ($b_1$) of the flow break-away edge and the length (l) of the edges extending from the tip to the base of the outline of the second protrusions have a ratio $b_1/l$ of at least 0.5 and no more than 0.9, preferably between 0.69 and 0.71.

17. The valve according to claim 12, in which the length ($b_2$) of the base and the length (l) of the edges extending from the tip to the base of the outline of the second protrusions have a ratio $b_2/l$ of at least 0.7 and no more than 1.1, preferably between 0.89 and 0.91.

18. The valve according to claim 12, in which the length ($b_3$) of the tip and the length (l) of the edges extending from the tip to the base of the outline of the second protrusions have a ratio $b_3/l$ of at least 0 and no more than 0.4, preferably between 0.09 and 0.11.

19. The valve according to claim 12, in which the height (h) of the second protrusions and the length (l) of the edges extending from the tip to the base of the outline of the second protrusions have a ratio h/l of at least 0.1 and no more than 0.5, preferably between 0.29 and 0.31.

20. The valve according to claim 2, in which the top surface of each of the second protrusions is configured as an upward ramp in the flow direction.

21. The valve according to claim 20, in which the top surface of each of the second protrusions has a planar configuration.

22. The valve according to claim 1, in which the first protrusions are arranged in one or more rows on the inner surface of the first flap extending transverse to the flow direction.

23. The valve according to claim 22, in which the first protrusions are arranged in staggered rows transverse to the flow direction.

24. The valve according to claim 1, further comprising a plurality of third protrusions spaced-apart on the outer surface of the second flap, each of the third protrusions of the second flap having a bottom portion on the outer surface of the second flap, side surfaces arranged in a closed outline projecting from the bottom portion of the third protrusions, and an exposed top surface projecting into the fluid flow through the opening between the inner environment and the outer environment.

25. The valve according to claim 24, in which the third protrusions are arranged in one or more rows on the outer surface of the second flap extending transverse to the flow direction.

26. The valve according to claim 24, in which two or more rows of first protrusions are arranged on the inner surface of the first flap and two or more rows of the third protrusions are arranged on the outer surface of the second flap.

27. The valve according to claim 1, in which the second protrusions are arranged in one or more rows on the inner surface of the second flap extending essentially transverse to the flow direction.

28. The valve according to claim 1, in which the number of first protrusions exceeds the number of the second protrusions.

29. The valve according to claim 28, in which the second protrusions have a larger volume than the first protrusions.

30. The valve according to claim 1, in which the bottom portions of the first and second protrusions have rounded edges.

31. The valve according to claim 1, in which the second flap has a rounded front edge providing a smooth connection to both the inner surface to the outer surface of the second flap facing the opening between the inner environment and the outer environment, the second protrusions are positioned on the inner surface of the second flap adjacent to the rounded front edge, and the first flap has a front edge that is not similarly rounded.

32. An outflow valve for an aircraft to control a fluid flow between an inner environment and an outer environment of the aircraft, comprising:
a frame arranged to be disposed in an opening between the inner environment and the outer environment of the aircraft;
a first flap and a second flap contacting the first flap, the flaps being moveable within the frame for controlling the fluid flow through the opening between the inner environment and the other environment,
each of the first and second flaps including an inner surface oriented within the frame for facing the inner environment and an outer surface oriented within the frame for facing the inner environment and an outer surface oriented within the frame for facing the outer environment in a close position of the outflow valve,
the first and second flaps having a mutually contacting area between the inner surface of the first flap and the outer surface of the second flap for closing the outflow valve,
the first flap including a plurality of first protrusions spaced-apart on the inner surface of the first flap,
the second flap including a plurality of second protrusions spaced-apart on the inner surface of the second flap,
the pluralities of first and second protrusions being spaced from the mutual contacting area of the flaps,
each of the first protrusions of the first flap having a bottom portion on the inner surface of the first flap,
each of the second protrusions of the second flap having a bottom portion on the inner surface of the second flap,
each of the first and second protrusions having side surfaces arranged in a closed outline projecting from the bottom portion of each of the first and second protrusions and an exposed top surface projecting into the fluid flow through the opening between the inner environment and the outer environment,
the closed outlines of the side surfaces and the exposed top surfaces of the spaced-apart protrusions on the inner surfaces of the first and second flaps providing for creating overlapping, mutually disruptive vortices in the fluid flow to reduce noise,
the first protrusions being arranged in staggered rows transverse to the flow direction,
a plurality of third protrusions being spaced-apart on the outer surface of the second flap, and
each of the third protrusions of the second flap having a bottom portion on the outer surface of the second flap, side surfaces arranged in a closed outline projecting from the bottom portion of the third protrusions, and an exposed top surface projecting into the fluid flow through the opening between the inner environment and the outer environment.

33. An outflow valve for an aircraft to control a fluid flow between an inner environment and an outer environment of the aircraft, comprising:
a frame arranged to be disposed in an opening between the inner environment and the outer environment of the aircraft;
a first flap and a second flap contacting the first flap, the flaps being moveable within the frame for controlling the fluid flow through the opening between the inner environment and the other environment,
each of the first and second flaps including an inner surface oriented within the frame for facing the inner environment and an outer surface oriented within the frame for facing the inner environment and an outer surface oriented within the frame for facing the outer environment in a close position of the outflow valve,
the first and second flaps having a mutually contacting area between the inner surface of the first flap and the outer surface of the second flap for closing the outflow valve,
the first flap including a plurality of first protrusions spaced-apart on the inner surface of the first flap,
the second flap including a plurality of second protrusions spaced-apart on the inner surface of the second flap,
the pluralities of first and second protrusions being spaced from the mutual contacting area of the flaps,
each of the first protrusions of the first flap having a bottom portion on the inner surface of the first flap,
each of the second protrusions of the second flap having a bottom portion on the inner surface of the second flap,
each of the first and second protrusions having side surfaces arranged in a closed outline projecting from the bottom portion of each of the first and second protrusions and an exposed top surface projecting into the fluid flow through the opening between the inner environment and the outer environment,
the closed outlines of the side surfaces and the exposed top surfaces of the spaced-apart protrusions on the inner surfaces of the first and second flaps providing for creating overlapping, mutually disruptive vortices in the fluid flow to reduce noise,
the first protrusions being arranged in staggered rows transverse to the flow direction,
a plurality of third protrusions being spaced-apart on the outer surface of the second flap,
each of the third protrusions of the second flap having a bottom portion on the outer surface of the second flap, side surfaces arranged in a closed outline projecting from the bottom portion of the third protrusions, and an exposed top surface projecting into the fluid flow through the opening between the inner environment and the outer environment, and
the number of first protrusions exceeding the number of the second protrusions.

\* \* \* \* \*